United States Patent
Chu et al.

(10) Patent No.: US 7,779,132 B1
(45) Date of Patent: Aug. 17, 2010

(54) METHOD AND APPARATUS FOR SUPPORTING MULTIPLE TRANSPORT LAYER IMPLEMENTATIONS UNDER A SOCKET INTERFACE

(75) Inventors: Hsiao-Keng J. Chu, Palo Alto, CA (US); Darrin P. Johnson, Mountain View, CA (US); Eric T. Cheng, San Mateo, CA (US)

(73) Assignee: Oracle America, Inc., Redwood Shores, CA (US)

( * ) Notice: Subject to any disclaimer, the term of this patent is extended or adjusted under 35 U.S.C. 154(b) by 924 days.

(21) Appl. No.: 11/274,600

(22) Filed: Nov. 14, 2005

(51) Int. Cl.
*G06F 15/173* (2006.01)
*G06F 15/16* (2006.01)

(52) U.S. Cl. .................. 709/227; 709/223; 709/228

(58) Field of Classification Search ......... 709/227–228, 709/230–232, 246, 250, 223
See application file for complete search history.

(56) References Cited

U.S. PATENT DOCUMENTS

| | | | | |
|---|---|---|---|---|
| 5,537,417 | A * | 7/1996 | Sharma et al. | 709/228 |
| 6,604,139 | B1 * | 8/2003 | Sajina et al. | 709/224 |
| 6,862,629 | B1 * | 3/2005 | Hericourt | 709/238 |
| 6,976,054 | B1 * | 12/2005 | Lavian et al. | 709/203 |
| 7,143,134 | B2 * | 11/2006 | Petrie et al. | 709/204 |
| 7,181,766 | B2 * | 2/2007 | Bendinelli et al. | 726/15 |
| 7,320,029 | B2 * | 1/2008 | Rinne et al. | 709/223 |
| 7,360,097 | B2 * | 4/2008 | Rothstein | 713/189 |
| 2002/0023037 | A1 * | 2/2002 | White, Jr. | 705/37 |
| 2004/0156392 | A1 * | 8/2004 | Walls et al. | 370/469 |
| 2005/0050202 | A1 * | 3/2005 | Aiken et al. | 709/227 |

* cited by examiner

*Primary Examiner*—Hussein A. El Chanti
(74) *Attorney, Agent, or Firm*—Park, Vaughan & Fleming LLP

(57) ABSTRACT

One embodiment of the present invention provides a system for communicating data using a socket interface with multiple transport layer implementations. During operation the system creates a socket which can be used with a set of transport layer implementations. Next, the system binds the socket to a local port without specifying a particular transport layer implementation. The system then receives a request to connect to a target port that is associated with a target address. Next, the system selects a protocol implementation from the set of transport layer implementations using the target port and the target address. The system then sends a connection request to the target port using the selected protocol implementation. Note that the present invention does not require changing a networking application because the transport layer implementation is selected automatically by the system, instead of requiring the application to possess the knowledge to select the appropriate transport layer implementation.

20 Claims, 4 Drawing Sheets

METHOD AND APPARATUS FOR SUPPORTING MULTIPLE TRANSPORT LAYER IMPLEMENTATIONS UNDER A SOCKET INTERFACE

BACKGROUND

1. Field of the Invention

The present invention relates to computer networking. More specifically, the present invention relates to a method and an apparatus for communicating data using a socket interface with multiple transport layer implementations.

2. Related Art

The Internet has permeated almost all aspects of our lives—from buying books to buying real estate, and from reading a newspaper to watching a movie. The Internet owes its incredible success to a number of key technologies which include TCP (Transport Control Protocol) and IP (Internet Protocol) which are standard networking protocols used on the Internet, and the socket API (Application Programming Interface) which is a standard networking interface that applications use to communicate over a TCP/IP network.

Over the years, networking speeds on the Internet have increased exponentially, which have brought, in addition to well known advantages, new bottlenecks in computers and network devices. A number of new technologies have been proposed to alleviate these bottlenecks.

Unfortunately, some of these technologies threaten to significantly complicate the structure of a TCP stack in an OS (Operating System). One such technology involves a transport layer protocol called Socket Direct Protocol (SDP). Although SDP is a significantly different protocol from TCP, it proclaims to be fully compatible with the socket API that is traditionally used with TCP. Specifically, SDP requires an RDMA (Remote Direct Memory Access) capable transport, and claims to provide much better efficiency for socket-based applications. (Further details on SDP can be found at the RDMA Consortium's website. Supporting multiple transport layer implementations under the same socket interface gives rise to many technical challenges, such as, the problem of managing a common port-number space between the various transport layer implementations.

TCP Offload Engine (TOE), which offloads TCP-related computations from the processor, is another technology proposal that threatens to complicate the structure of a TCP stack. TOE provides full compatibility, both in the wire protocol, and in the API semantics with a traditional socket interface that works with TCP. Unfortunately, the industry is still debating as to how much TCP-related computation should be offloaded to the TOE, which has resulted in different companies offering different flavors of TOEs, each with vastly different capabilities. Again, this also creates technical challenges that essentially amount to supporting multiple transport layer implementations under the same socket interface.

A naïve approach to support multiple transports is to simply provide multiple transport stacks underneath the socket layer, i.e., one transport stack per TCP/SDP/TOE implementation. Since all of these transport stacks support the same AF_INET/SOCK_STREAM/IPPROTO_TCP sockets, for a socket application, some other mechanism must be used to select which transport to use. Unfortunately, this selection mechanism will most likely require the application to possess the knowledge of how to select the "right" transport, which can lead to difficult problems. Specifically, this approach may require changes to the application, which is often impossible or impractical.

To understand why, note that, on the listener side, most applications use a single listener process/thread to listen to connection requests on all network interfaces. In the naïve approach described above, an application may have to start multiple listener processes/threads, one for each type of transport implementation. This will most likely involve changing the application software, the cost of which can be prohibitive.

Another approach used to support multiple transports under a socket interface is to bind the application to a specific interface. For example, to support TCP and SDP, this technique requires the system administrator to allocate a separate IP address to the SDP physical interface and the TCP physical interface, and then the application has to specifically bind to the SDP or the TCP physical interface in order to use the corresponding protocol implementation. Since applications typically do not bind to a specific interface, this approach is likely to require changes to the application software which can be impractical or impossible.

Furthermore, supporting multiple transport implementations using present approaches is likely to duplicate vast amounts of code, since present approaches require each transport stack to be a full implementation of the transport protocol.

Hence, what is needed is a method and an apparatus for supporting multiple transport layer implementations under a socket interface without the above-described problems.

SUMMARY

One embodiment of the present invention provides a system for communicating data using a socket interface with multiple transport layer implementations. (A transport layer implementation is an embodiment of a transport layer protocol in hardware or software or a combination thereof.) During operation the system creates a socket which can be used with a set of transport layer implementations. Next, the system binds the socket to a local port without specifying a particular transport layer implementation. The system then receives a request to connect to a target port that is associated with a target address. Next, the system selects an implementation from the set of transport layer implementations using the target port and the target address. The system then sends a connection request to the target port using the selected protocol implementation. Note that the present invention does not require networking applications to be changed because the transport layer implementation is selected automatically by the system, instead of requiring the application to possess the knowledge to select the appropriate transport layer implementation.

In a variation on this embodiment, the set of transport layer implementations comprises different implementations of TCP (Transport Control Protocol) or different flavors of TOEs (TCP Offload Engines).

In a variation on this embodiment, the set of transport layer implementations can comprise an implementation of SDP (Socket Direct Protocol).

In a variation on this embodiment, the system allows a networking application to work seamlessly with multiple transport layer implementations without requiring any changes to the networking application.

In a variation on this embodiment, the system selects the protocol implementation by determining a round-trip time to the target address.

One embodiment of the present invention provides a system for communicating data using a socket interface with multiple transport layer implementations. During operation, the system creates a socket which can be used with a set of transport layer implementations. Next, the system binds the socket to a local port without specifying a particular transport layer implementation. The system then listens for connection requests on the local port. Next, the system receives a connection request at the local port from a target port that is associated with a target address. The system then selects an implementation from the set of transport layer implementations based on the target port and the target address. Next, the system sends a connection response to the target port using the selected protocol implementation.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

Networking Software Stack

Communication between two nodes of a network is typically accomplished using a layered software architecture, which is often referred to as a networking software stack or simply a networking stack.

Each layer is usually associated with a set of protocols which define the rules and conventions for processing packets in that layer. Each lower layer performs a service for the layer immediately above it to help with processing packets. Furthermore, each layer typically adds a header (control data) that allows peer layers to communicate with one another.

At the sender, this process of adding layer specific headers is usually performed at each layer as the payload moves from higher layers to lower layers. The receiving host generally performs the reverse of this process by processing headers of each layer as the payload moves from the lowest layer to the highest layer.

Figure 1:
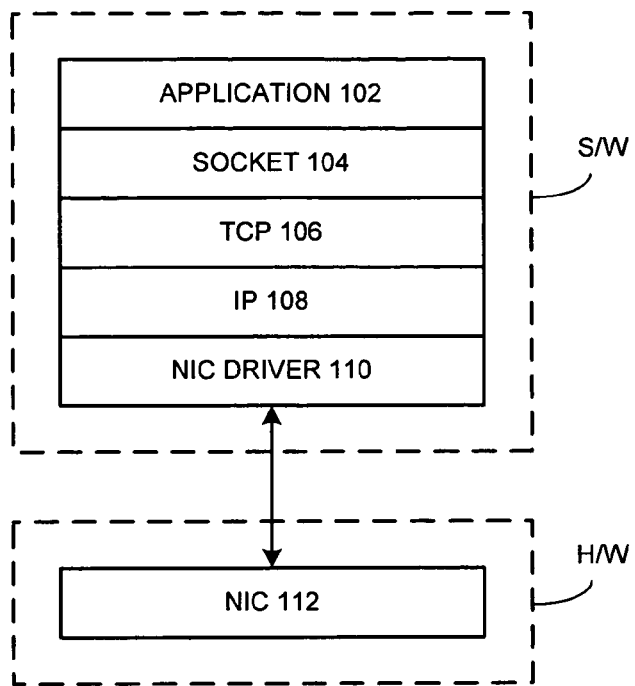
FIG. 1 illustrates the layers of a networking software stack for a system with a single transport layer implementation under a socket interface in accordance with an embodiment of the present invention.

FIG. 1 illustrates the layers of a networking software stack for a system with a single transport layer implementation under a socket interface in accordance with an embodiment of the present invention.

Application layer 102 typically contains networking applications that communicate with other networking applications over a network. In a TCP/IP network, applications often communicate with one another using a socket layer 104 which provides a convenient abstraction for communicating with remote applications. The socket layer 104 usually employs a transport protocol, such as TCP 106, to communicate with its peers. TCP 106, in turn, uses IP 108 to send/receive packets to/from other nodes in the network. The IP 108 layer typically sends and receives data using a NIC 112 which is controlled by a NIC driver 110.

As is true of any data processing function, a networking layer can be implemented using hardware or software or a combination thereof. The decision implement a specific networking layer in hardware or software is typically based on a tradeoff between performance and cost.

In the networking stack shown in FIG. 1, all TCP-related computation is performed in software. The NIC 112 is typically capable of only performing rudimentary operations that are necessary for sending and receiving packets of a data link layer protocol, such as Ethernet. TCP-related computations have traditionally been implemented in software because transport layer protocols, such as TCP, contain many complex computations that can be costly to implement in silicon. Furthermore, in the past, data rates have been low enough to justify performing TCP-related computations in software using a generic processor.

However, emerging networking applications and system architectures are causing the processor to spend an ever-increasing amount of time performing TCP-related computations. These developments have prompted system architects to propose a number of new technologies to alleviate the computation burden on the processor.

Specifically, a new transport layer protocol called SDP has been proposed, which is optimized for a new high speed interconnect called InfiniBand (IB). Further, rapid advances in the design and manufacturing of integrated circuits have drastically reduced the cost for creating integrated circuits that are specifically designed to perform TCP-related computations. These developments have led to the introduction of TCP Offload engines that offload TCP-related computations from the processor.

Unfortunately, the industry is still debating as to how much TCP-related computation should be offloaded to the TOE. For example, some TOE implementations may only offload fragmentation/reassembly and checksum computations, which are some of the most computationally intensive operations that TCP performs. On the other hand, other TOE implementations may offload almost all TCP-related computations including connection management. Due to the large variation in the capabilities of these different TOE implementations, it is likely that a system may have to support multiple TOE implementations under the same socket interface.

Figure 2A:
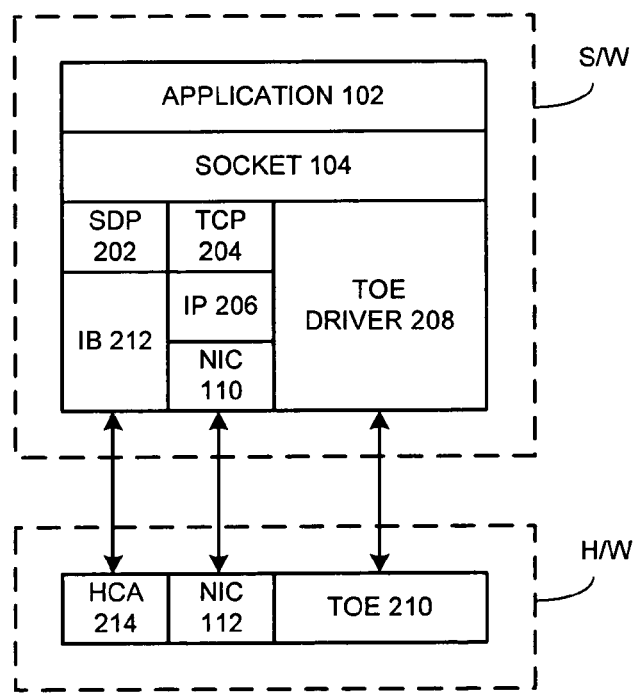
FIG. 2A illustrates the layers of a networking software stack for a system with multiple transport layer implementations under a socket interface in accordance with an embodiment of the present invention.

FIG. 2A illustrates the layers of a networking software stack for a system with multiple transport layer implementations under a socket interface in accordance with an embodiment of the present invention.

The socket layer 104 can send and receive packets using multiple transports. Specifically, the socket layer 104 can either use the SDP layer 202, the TCP layer 204, or the TOE driver 208 which controls the TOE 210. Note that the SDP layer 202 sits on top of the InfiniBand driver 212 which controls the Host Channel Adaptor 214. Likewise, the TCP layer 204 sits on top of the IP layer 206 which sends and receives packets using the NIC driver 110 which controls the NIC 112.

In a naïve implementation, each of these transports comprises a complete transport stack. As mentioned before, such naïve implementations have many problems. In particular, the application layer 102 may have to select an appropriate transport (e.g., SDP, TCP, or TOE) when it requests the socket layer 104 to create and/or bind a socket. As a result, this approach will most likely involve changing the application software, the cost of which can be prohibitive.

Note that interfacing a TOE with an OS usually does not require changes to the application layer 102 or the socket layer 104, which are shown in FIG. 2A exactly the same way as they were shown in FIG. 1. On the other hand, the TCP layer 106 and the IP layer 108 shown in FIG. 1 usually need to be changed to accommodate the TOE. Specifically, in one embodiment, the interface between the TOE 210 and the OS comprises the interface between TOE driver 208 and the socket layer 104. In another embodiment, the TOE/OS interface can further include interfaces between the TOE driver 208 and other networking layers or software modules, such as the TCP 204 layer, the IP layer 206, and the NIC driver 110.

Figure 2B:
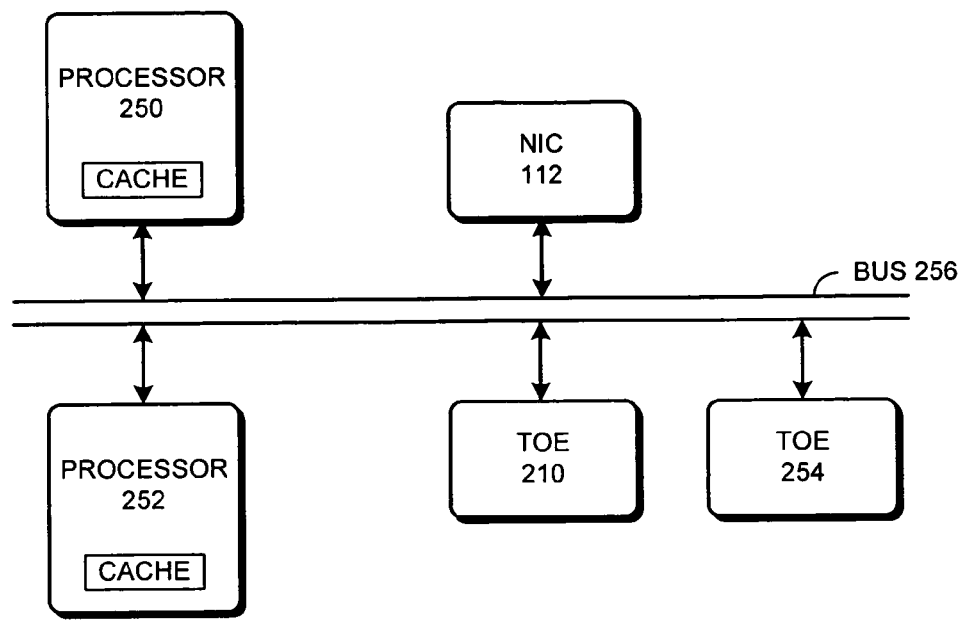
FIG. 2B illustrates a system that uses a TOE to offload TCP-related computations from a processor in accordance with an embodiment of the present invention.

FIG. 2B illustrates a system that uses a TOE to offload TCP-related computations from a processor in accordance with an embodiment of the present invention.

The system illustrated in FIG. 2B comprises multiple processors 250 and 252 which can be part of an SMP. The system further comprises NIC 112, and TOEs 210 and 254. All of these components communicate with one another via the system bus 256. (The system shown in FIG. 2B is for illustration purposes only. Specifically, it will be apparent to one skilled in the art that the present invention is also applicable to other systems that have different architectures or that have different number of processors, NICs, and TOEs.)

Note that the NIC driver 110 and the NIC 112 shown in FIG. 2A can coexist with their TOE counterparts. In one embodiment, TCP packets that are sent via NIC 112 are processed in software by TCP 204 and IP 206 layers, while the TCP packets that are sent via the TOE are processed by the TOE 210. In another embodiment, TOE 210 only performs TCP-related computations, but does not comprise a transceiver that can transmit or receive packets from the network. In such cases, TOE 210 needs to communicate with NIC 112 to send and receive TCP packets from the network. Note that this communication can be performed either using a software interface between the TOE driver 208 and the NIC driver 110 or directly in hardware via system bus 256.

Supporting Multiple Transport Layer Implementations

As mentioned before, current approaches for supporting multiple transport layers under a socket interface have many drawbacks. One of the problems is that the application has to select the transport layer, which may not be possible in many situations. As such, it seems preferable to leave the selection of the transport to the stack. The most obvious candidate would be based on the route for a connection. But there is a problem with this approach—it can only be done after a connection target is known. This can leave socket calls such as bind( ) listen( ) in the cold without any hint on which transport to use.

Figure 3:
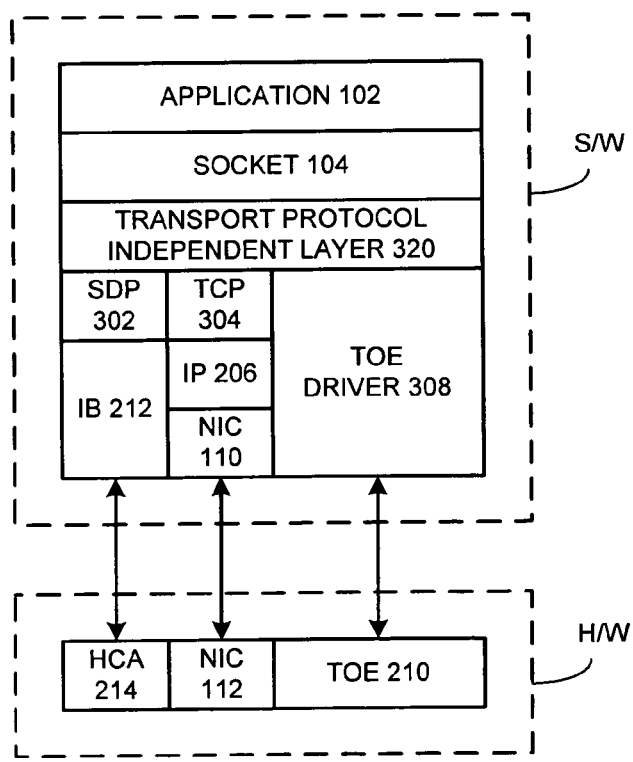
FIG. 3 illustrates the layers of a networking software stack for a system with multiple transport layer implementations using a transport protocol independent layer in accordance with an embodiment of the present invention.

FIG. 3 illustrates the layers of a networking software stack for a system with multiple transport layer implementations using a transport protocol independent layer in accordance with an embodiment of the present invention.

One embodiment of the present invention is based on the following insight: the TCP layer in a networking stack can be further divided into two layers. The first is a transport protocol independent layer 320. This layer performs functions (e.g., port management) that are independent of the specific transport layer implementation. The second layer comprises all the functions that are specific to the particular transport layer protocol. Specifically, TCP layer 304 and SDP layer 302 comprise TCP specific functions and SDP specific functions, respectively. Likewise, TOE driver 308 may perform any TCP specific functions that are not implemented by the TOE 210, but the TOE driver 308 does not perform functions (e.g., connection management) that are performed by the transport protocol independent layer 320.

Note that the above approach is not the same as adding a separate layer between the transport layers and the socket layer. Instead, in the present invention, TCP is split into two layers—a transport independent layer and a transport dependent layer. Next, each transport layer implementation is modified so that it only contains the protocol specific functions. In this manner, the present invention reduces the amount of duplicate code because the transport protocol independent layer is shared among all transports. Furthermore, the present invention does not require applications to be changed because the transport selection is performed automatically by the networking stack, instead of requiring the application to possess the knowledge to select the appropriate transport layer implementation. Finally, in the present invention, since port management does not require complex interactions between the transport protocol independent layer and the various transport layer implementations, the present invention can support multiple transports under a socket interface without sacrificing performance.

Figure 4A:
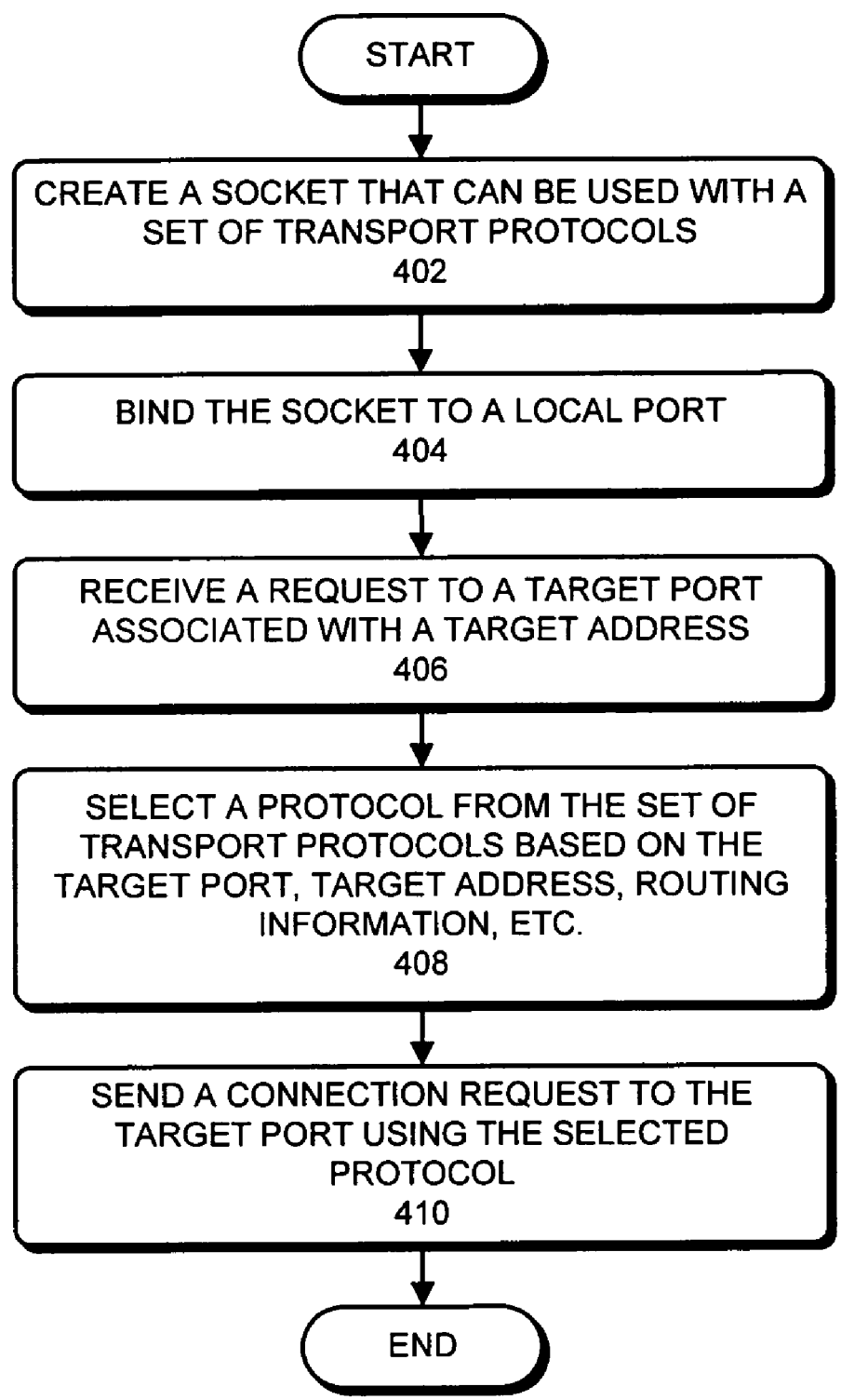
FIG. 4A presents a flowchart that illustrates a process for sending connection requests using a socket with multiple transport layer implementations in accordance with an embodiment of the present invention.

FIG. 4A presents a flowchart that illustrates a process for sending connection requests using a socket with multiple transport layer implementations in accordance with an embodiment of the present invention.

The process usually begins by creating a socket which can be used with a set of transport layer implementations (step 402). Note that the set of transport layer implementations can include SDP, different versions of TCP, or different flavors of TOEs.

Next, the system binds the socket to a local port without specifying a particular transport layer implementation in the set of transport layer implementations (step 404).

Note that the socket is not bound to a specific transport layer implementation. Instead, the transport layer implementation is chosen when a connection request is sent. In contrast, present techniques require the application to specify the transport layer implementation at this step, which can cause serious problems because an application usually does not possess the knowledge for making such a selection. Specifically, in order to properly select a transport layer, the application needs to know which interface the connection requests is going to be sent based on the target port and address, which is typically only known to the IP layer.

The system then receives a request to connect to a target port that is associated with a target address (step 406).

Next, the system selects a protocol implementation from the set of transport layer implementations using the target port, the target address, routing information, etc. (step 408).

Note that the system doesn't necessarily have to use both the target port and the target address to choose the transport layer implementation. For example, the system may select the protocol implementation using only the target address or only the target port. On the other hand, the system may use additional information, such as a round trip time to the target address to make its selection.

Furthermore, since the process automatically selects a transport layer implementation using the target port and target address, the process allows a networking application to work seamlessly with multiple transport layer implementations without requiring any changes to the networking application. In other words, one embodiment of the present invention seamlessly supports multiple transport layer implementations under a socket interface.

The system then sends a connection request to the target port using the selected protocol implementation (step 410).

Figure 4B:
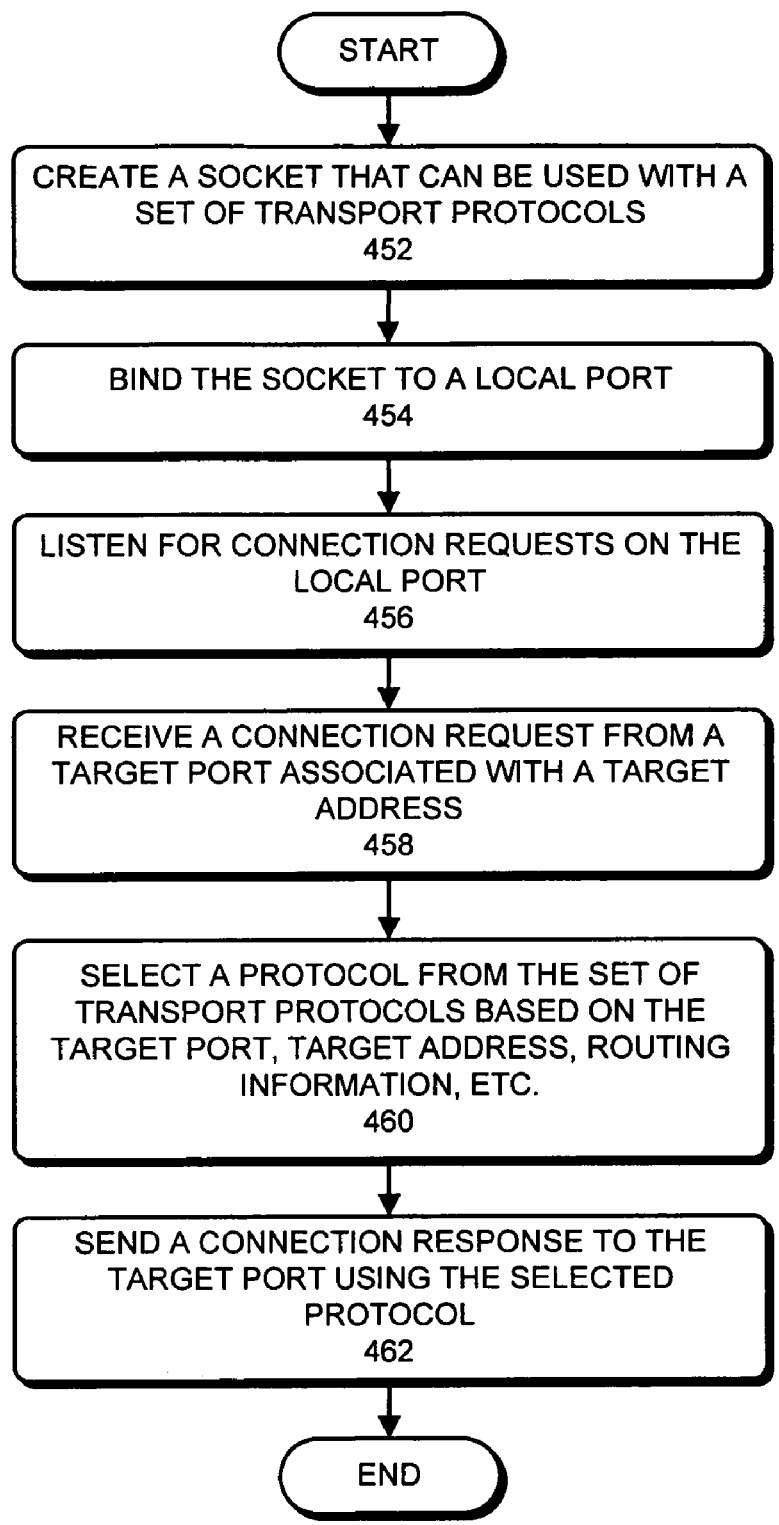
FIG. 4B presents a flowchart that illustrates a process for listening for connection requests using a socket with multiple transport layer implementations in accordance with an embodiment of the present invention.

FIG. 4B presents a flowchart that illustrates a process for listening for connection requests using a socket with multiple transport layer implementations in accordance with an embodiment of the present invention.

The process usually begins by creating a socket which can be used with a set of transport layer implementations (step 452).

Next, the system binds the socket to a local port without requiring the socket to use a specific transport layer implementation in the set of transport layer implementations (step 454).

As before, the socket is not bound to a specific transport layer implementation; instead, the transport layer implementation is chosen when a connection request is received.

The system then listens for connection requests on the local port (step 456).

Next, the system receives a connection request at the local port from a target port that is associated with a target address (step 458).

The system then selects a protocol implementation from the set of transport layer implementations using the target port, the target address, routing information, etc. (step 460).

The system then sends a connection response to the target port using the selected protocol implementation (step 462).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-readable storage medium storing instructions that when executed by a computer cause the computer to perform a method for communicating data using a socket interface with multiple transport layer implementations, the method comprising:

creating a socket which can be used with a set of transport layer implementations, wherein the set of transport layer implementations share a transport protocol independent layer that performs protocol-independent functions;

binding the socket to a local port without specifying a particular transport layer implementation;

receiving a request to connect to a target port that is associated with a target address;

after binding the socket to the local port and responsive to receiving the request to connect, selecting a protocol implementation from the set of transport layer implementations using the target port and the target address; and sending a connection request to the target port using the selected protocol implementation.

2. The computer-readable storage medium of claim 1, wherein the set of transport layer implementations can comprise different versions of TCP (Transport Control Protocol) implementations or different flavors of TOEs (TCP Offload Engines).

3. The computer-readable storage medium of claim 1, wherein the set of transport layer implementations can comprise an SDP (Socket Direct Protocol) implementation.

4. The computer-readable storage medium of claim 1, wherein the method allows a networking application to work seamlessly with multiple transport layer implementations without requiring any changes to the networking application.

5. The computer-readable storage medium of claim 1, wherein selecting the protocol implementation involves determining a round-trip time to the target address.

6. A computer-readable storage medium storing instructions that when executed by a computer cause the computer to perform a method for communicating data using a socket interface with multiple transport layer implementations, the method comprising:

creating a socket which can be used with a set of transport layer implementations, wherein the set of transport layer implementations share a transport protocol independent layer that performs protocol-independent functions;

binding the socket to a local port without specifying a particular transport layer implementation;

listening for connection requests on the local port;

receiving a connection request at the local port from a target port that is associated with a target address;

after binding the socket to the local port and responsive to receiving the connection request, selecting a protocol implementation from the set of transport layer implementations based on the target port and the target address; and sending a connection response to the target port using the selected protocol implementation.

7. The computer-readable storage medium of claim 6, wherein the set of transport layer implementations can comprise different versions of TCP (Transport Control Protocol) implementations or different flavors of TOEs (TCP Offload Engines).

8. The computer-readable storage medium of claim 6, wherein the set of transport layer implementations can comprise an SDP (Socket Direct Protocol) implementation.

9. The computer-readable storage medium of claim 6, wherein the method allows a networking application to work seamlessly with multiple transport layer implementations without requiring any changes to the networking application.

10. The computer-readable storage medium of claim 6, wherein selecting the protocol implementation involves determining a round-trip time to the target address.

11. An apparatus for communicating data using a socket interface with multiple transport layer implementations, the apparatus comprising:

at least one processor that performs a set of computations, wherein the set of computations comprises:

creating a socket which can be used with a set of transport layer implementations, wherein the set of transport layer implementations share a transport protocol independent layer that performs protocol-independent functions;

binding the socket to a local port without specifying a particular transport layer implementation;

receiving a request to connect to a target port that is associated with a target address;

after binding the socket to the local port, and responsive to receiving the request to connect to a target port, selecting a protocol from the set of transport layer implementations using the target port and the target address; and sending a connection request to the target port using the selected protocol implementation; and a memory.

12. The apparatus of claim 11, wherein the set of transport layer implementations can comprise different versions of TCP (Transport Control Protocol) implementations or different flavors of TOEs (TCP Offload Engines).

13. The apparatus of claim 11, wherein the set of transport layer implementations can comprise an SDP (Socket Direct Protocol) implementation.

14. The apparatus of claim 11, wherein the apparatus allows a networking application to work seamlessly with multiple transport layer implementations without requiring any changes to the networking application.

15. The apparatus of claim 11, wherein selecting a protocol comprises determining a round-trip time to the target address.

16. An apparatus for communicating data using a socket interface with multiple transport layer implementations, the apparatus comprising:

at least one processor that performs a set of computations, wherein the set of computations comprises:

creating a socket which can be used with a set of transport layer implementations, wherein the set of transport layer implementations share a transport protocol independent layer that performs protocol-independent functions;

binding the socket to a local port without specifying a particular transport layer implementation;

listening for connection requests on the local port;

receiving a connection request at the local port from a target port that is associated with a target address;

after binding the socket to the local port, and responsive to receiving the connection request, selecting a protocol implementation from the set of transport layer implementations based on the target port and the target address; and sending a connection response to the target port using the selected protocol implementation; and a memory.

17. The apparatus of claim 16, wherein the set of transport layer implementations can comprise different versions of TCP (Transport Control Protocol) implementations or different flavors of TOEs (TCP Offload Engines).

18. The apparatus of claim 16, wherein the set of transport layer implementations can comprise an SDP (Socket Direct Protocol) implementation.

19. The apparatus of claim 16, wherein the apparatus allows a networking application to work seamlessly with multiple transport layer implementations without requiring any changes to the networking application.

20. The apparatus of claim 16, wherein selecting a protocol implementation comprises determining a round-trip time to the target address.

* * * * *